US011226971B2

(12) United States Patent
Kamijoh

(10) Patent No.: US 11,226,971 B2
(45) Date of Patent: Jan. 18, 2022

(54) BLOCKCHAIN IMPLEMENTING RELIABILITY DATABASE

(71) Applicant: International Business Machines Corporation, Armonk, NY (US)

(72) Inventor: Kohichi Kamijoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 16/150,551

(22) Filed: Oct. 3, 2018

(65) Prior Publication Data

US 2020/0110812 A1   Apr. 9, 2020

(51) Int. Cl.
| | | |
|---|---|---|
| *H04L 29/06* | (2006.01) |
| *H04L 9/06* | (2006.01) |
| *G06F 16/182* | (2019.01) |
| *G06F 16/18* | (2019.01) |
| *G06F 16/2457* | (2019.01) |
| *G06F 16/14* | (2019.01) |
| *G06F 16/242* | (2019.01) |

(52) U.S. Cl.
CPC ...... *G06F 16/24578* (2019.01); *G06F 16/144* (2019.01); *G06F 16/182* (2019.01); *G06F 16/1805* (2019.01); *G06F 16/242* (2019.01); *H04L 9/0643* (2013.01); *H04L 63/10* (2013.01); *H04L 2209/38* (2013.01)

(58) Field of Classification Search
None
See application file for complete search history.

(56) References Cited

U.S. PATENT DOCUMENTS

| | | |
|---|---|---|
| 9,635,000 B1 | 4/2017 | Muftic |
| 9,875,510 B1 | 1/2018 | Kasper |
| 10,616,324 B1 * | 4/2020 | Kaddoura ............. H04L 69/329 |
| 2016/0261690 A1 | 9/2016 | Ford |
| 2017/0048216 A1 | 2/2017 | Chow et al. |
| 2017/0187535 A1 | 6/2017 | Middleton et al. |
| 2017/0236120 A1 | 8/2017 | Herlihy et al. |
| 2017/0337625 A1 | 11/2017 | Rosenblatt et al. |

(Continued)

FOREIGN PATENT DOCUMENTS

| | | |
|---|---|---|
| WO | 2017187395 A1 | 11/2017 |
| WO | 2017192007 A2 | 11/2017 |

OTHER PUBLICATIONS

Christian Decker and Roger Wattenhofer, Information Propagation i the Bitcoin Network, Published in Peer to Peer Computing (P2P), 2013 IEEE Thriteenth International Conference.

(Continued)

*Primary Examiner* — Robert W Beausoliel, Jr.
*Assistant Examiner* — Cheryl M Shechtman

(57) ABSTRACT

An example operation may include one or more of receiving a request to modify a reliability value of an off-chain data source to generate a modified reliability value, determining whether a consensus on the modified reliability value has been received among a plurality of peer nodes, and in response to a determination that the consensus has been received, updating a storage to reflect the modified reliability value associated with the off-chain data source, and storing an identification of the modified reliability value within a block among a hash-linked chain of blocks on a distributed ledger shared among the plurality of peer nodes.

15 Claims, 19 Drawing Sheets

(56) References Cited

U.S. PATENT DOCUMENTS

| | | | |
|---|---|---|---|
| 2017/0352027 | A1 | 12/2017 | Zhang et al. |
| 2017/0353309 | A1 | 12/2017 | Gray |
| 2018/0075421 | A1 | 3/2018 | Serrano et al. |
| 2018/0075527 | A1 | 3/2018 | Nagla et al. |
| 2018/0205552 | A1 | 7/2018 | Struttmann et al. |
| 2018/0253451 | A1* | 9/2018 | Callan ............... H04L 63/123 |
| 2019/0089717 | A1 | 3/2019 | Dolev et al. |
| 2019/0188706 | A1* | 6/2019 | McCurtis ............. G06Q 20/02 |
| 2019/0236606 | A1* | 8/2019 | Padmanabhan ..... G06Q 20/401 |
| 2019/0259274 | A1 | 8/2019 | Avery et al. |
| 2019/0305957 | A1* | 10/2019 | Reddy ................ H04L 63/123 |
| 2019/0327218 | A1 | 10/2019 | Altenhofen et al. |
| 2019/0354723 | A1 | 11/2019 | Dassenno |
| 2020/0322132 | A1* | 10/2020 | Covaci ............... G06F 16/2246 |
| 2020/0394651 | A1* | 12/2020 | Kreder, III ........... G06Q 20/22 |
| 2021/0160056 | A1* | 5/2021 | Yan ..................... G06F 21/602 |

OTHER PUBLICATIONS

Zhang, Wei-Wei, Zhang, Ke-Jia, Cryptanalysis and improvement of the quantum private comparison protocol with semi-honest third party. Published online: Nov. 11, 2012 © Springer Science+Business Media New York 2012, Quantum Inf Process (2013) 12:1981-1990.

List of IBM Patents or Patent Applications Treated as Related, Oct. 16, 2018.

Kohichi Kamijoh, "Blockchain Implementing Reliability Database", U.S. Appl. No. 16/150,566, filed Oct. 3, 2018.

Kohichi Kamijoh, "Blockchain Implementing Reliability Database", U.S. Appl. No. 16/150,530, filed Oct. 3, 2018.

\* cited by examiner

(Reliability Service)

Reliability A = (r*C(Org. D) + r²*C(Org. G) + C(Org. C) + r²*C(Org. H)) / (r + r² + 1 + r²)

where r = ratio (0 < r <= 1) for recursion depth
C(X) = reliability of org X (-1 to 1) * the reliability data by X

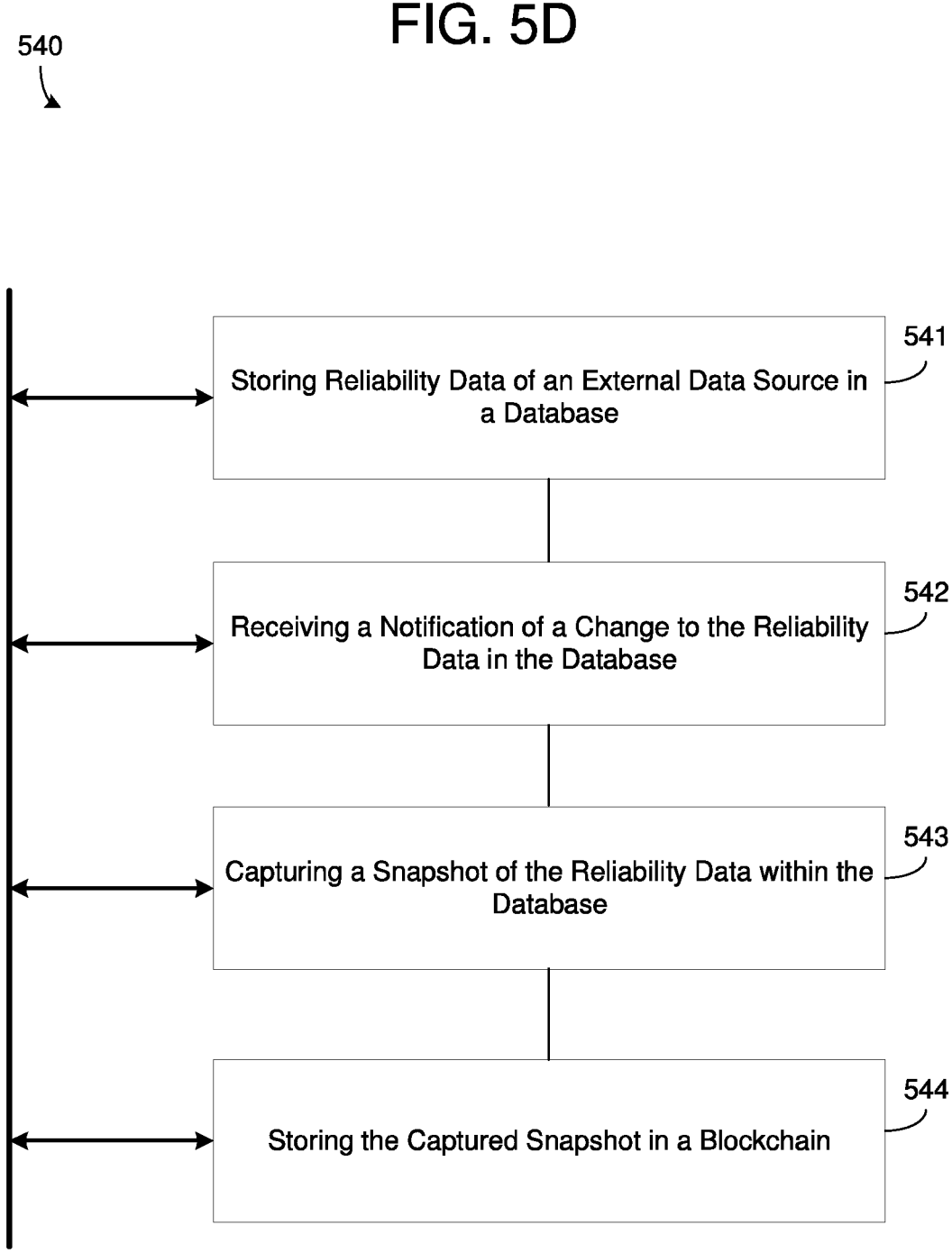

600

BLOCKCHAIN IMPLEMENTING RELIABILITY DATABASE

TECHNICAL FIELD

This application generally relates to a database storage system, and more particularly, to a decentralized database such as a blockchain in which reliability information of external data sources may be stored within a database on a blockchain ledger.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks occur when the centralized database experiences of high traffic due to the single location. Furthermore, a centralized database provides limited access to data because only one copy of the data is maintained by the database. As a result, multiple users may not be able to access the same piece of data at the same time without creating problems such as overwriting stored data. Furthermore, because a central database system has minimal to no data redundancy, if a set of data is unexpectedly lost it is difficult to retrieve it other than through manual operation from back-up disk storage.

A decentralized database such as a blockchain system provides a storage system capable of addressing the drawbacks of a centralized database. In a blockchain system, multiple peer nodes store a distributed ledger which includes a blockchain. Clients interact with peer nodes to gain access to the blockchain. The peer nodes may be controlled by different entities having different interests and therefore are not trusting entities with respect to one another. Furthermore, there is no central authority in a blockchain. Therefore, in order for data to be added to or changed on the distributed ledger in a trusted manner, a consensus of peer nodes must occur. The consensus provides a way for trust to be achieved in a blockchain system of untrusting peer nodes.

Transactions which are performed via a blockchain between parties may require data from an external source (e.g., stocks, medical information, property information, documents, and the like). At present, it is difficult for a blockchain to verify that the external source or the data provided from the external source is reliable. In other words, the blockchain typically "takes the word" of the external data source. Also, external sources may have a reliability that changes over time. For example, an external source may be reliable during a first period of time, but may become unreliable when the data source is compromised by a hacker or other malicious party. Accordingly, what is needed is a mechanism for keeping and updating a reliability of an external data source.

SUMMARY

One example embodiment may provide a system that includes one or more of a network interface configured to receive a request to modify a reliability value of an off-chain data source to generate a modified reliability value, and a processor configured to one or more of determine whether a consensus on the modified reliability value has been received among a plurality of peer nodes, and, in response to a determination that the consensus has been received, update a storage to reflect the modified reliability value associated with the off-chain data source, and store an identification of the modified reliability value within a block among a hash-linked chain of blocks on a distributed ledger shared among the plurality of peer nodes.

Another example embodiment may provide a method that includes one or more of receiving a request to modify a reliability value of an off-chain data source to generate a modified reliability value, determining whether a consensus on the modified reliability value has been received among a plurality of peer nodes, and in response to a determination that the consensus has been received, updating a storage to reflect the modified reliability value associated with the off-chain data source, and storing an identification of the modified reliability value within a block among a hash-linked chain of blocks on a distributed ledger shared among the plurality of peer nodes.

A further example embodiment may provide a non-transitory computer readable medium comprising instructions, that when read by a processor, cause the processor to perform one or more of receiving a request to modify a reliability value of an off-chain data source to generate a modified reliability value, determining whether a consensus on the modified reliability value has been received among a plurality of peer nodes, and in response to a determination that the consensus has been received, updating a storage to reflect the modified reliability value associated with the off-chain data source, and storing an identification of the modified reliability value within a block among a hash-linked chain of blocks on a distributed ledger shared among the plurality of peer nodes.

Another example embodiment may provide a system that includes one or more of a storage configured to store data of one or more off-chain data sources within a database, a network interface configured to receive a notification of a change to the data of the one or more off-chain data sources stored in the database, and a processor configured to one or more of capture a snapshot of the data within the database based on the notification, where the snapshot identifies a historical state of the data within the database, and store the captured snapshot of the data in a block from among a hash-linked chain of blocks on a distributed ledger.

Another example embodiment may provide a method that includes one or more of storing data of one or more off-chain data sources within a database, receiving a notification of a change to the data of the one or more off-chain data sources stored in the database, capturing a snapshot of the data within the database based on the notification, where the snapshot identifies a historical state of the data within the database, and storing the captured snapshot of the data in a block from among a hash-linked chain of blocks on a distributed ledger.

BRIEF DESCRIPTION OF THE DRAWINGS

FIG. 5D is a diagram illustrating a method of storing a snapshot of a database via a blockchain, according to example embodiments.

DETAILED DESCRIPTION

Figure 1:
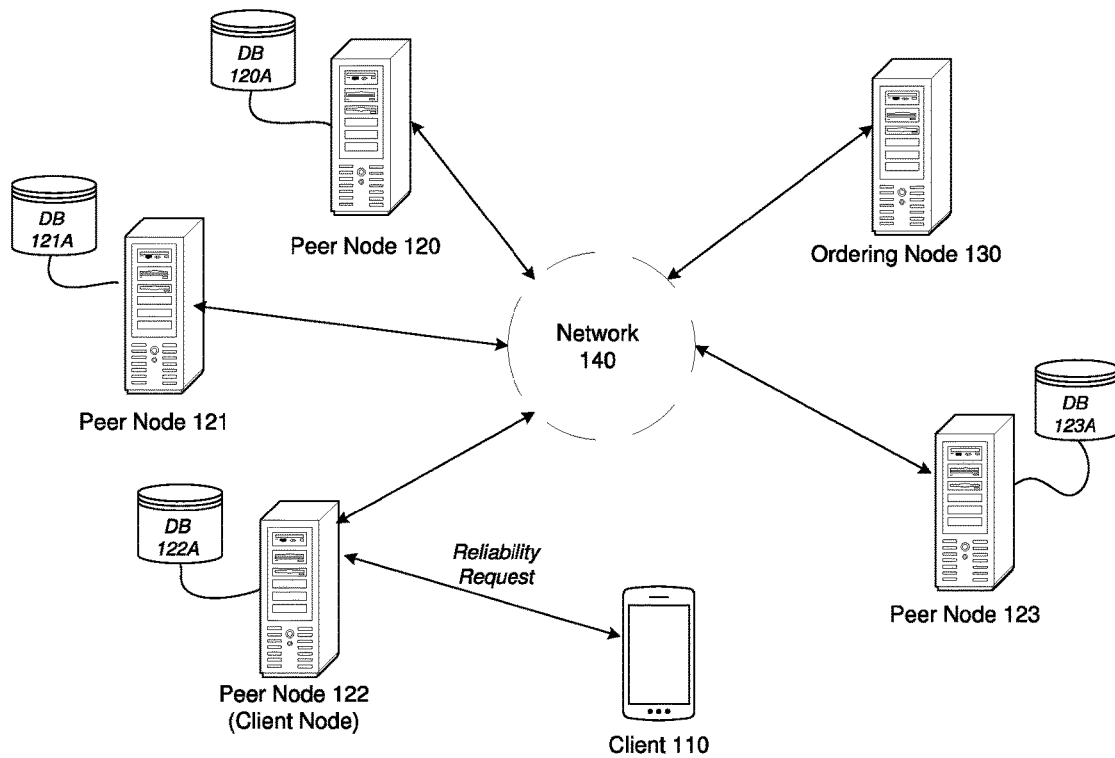
FIG. 1 is a diagram illustrating of a blockchain network implementing a reliability database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a blockchain network which implements a database via a distributed ledger for storing and tracking changes to reliability of external data sources. External data sources often provide data that is relied on when conducting transactions or other storage on a blockchain. For example, two parties may rely on a stock price, an insurance report, a medical file, an appraisal, and the like, from an external data source. External data sources can include organizations, enterprises, groups, individuals, software applications, systems, and the like. Prior to the example embodiments, it was difficult to attribute trust to external data sources and therefore these sources were taken as valid. The example embodiments provide a mechanism for assigning a trust (reliability value) to external data and/or an external data source. The reliability information can be stored in a reliability database within a distributed ledger that is shared among a plurality of blockchain peer nodes. Furthermore, changes in reliability of the external data source can be tracked through a blockchain on the distributed ledger.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

External data is often used as a factor in execution of transactions and other requests via a blockchain. For example, at a time oft contract, the transaction conditions such as an amount may be decided based on data provided by a third party. This is just one example of an external data provider. Other examples include, but are not limited to, stocks, insurance, medical information, financial data, weather, and the like. However, it is possible that the data from the data provider and/or the data provider itself is not reliable. Furthermore, the reliability may change over time due to various factors such as malicious attack, improved calculations, better sensors, and the like. Therefore, it may be desirable for a client transacting on a blockchain to know a reliability of the external data source before they conduct business on the blockchain.

The example embodiments overcome these drawbacks by providing a service that can determine a reliability of an external data source based on historical dealings or other factors. Furthermore, the service can be used by blockchain peer nodes to keep and track reliability data of the external data sources providing data to a blockchain shared among the peer nodes. Each peer node may store a reliability database that is implemented within a distributed ledger that includes the blockchain. Accordingly, the reliability database may be managed on-chain. Within the reliability database, the peer node may store and proactively update reliability values that are received from the reliability service. In some cases, the reliability data from the reliability service may be determined recursively from other entities when there is no direct reliability value for an external data source.

Some benefits of the instant solutions described and depicted herein include an improvement to the trust of a blockchain network therefore preventing improper transactions and fraud from occurring on the blockchain. In doing so, the system creates a more reliability blockchain system that can be trusted. Furthermore, changes in reliability value can be tracked on a blockchain and only committed to the blockchain when a consensus has been received from the peer nodes of the blockchain.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the decentralized and distributed nature of the blockchain along with the consensus ensures that the reliability of an external data source is fairly and adequately tracked by the blockchain network as a whole, and not just a central authority which is susceptible to fraud or mistake.

In some embodiments, each peer may determine a reliability of inputted data. Furthermore, the blockchain network may determine a final reliability based on consensus (agreement) with all of other peers that also calculate a reliability of the inputted data. The consensus method may be pre-defined between the peer nodes, for example, average, median, maximum, minimum, etc. Furthermore, changes to the reliability data may be received from the service and they may be propagated through the blockchain network after a consensus has been reached. The changes may be recorded within a blockchain thereby keeping a historical chain of reliability for an external data source on the immutable ledger.

The example embodiments also change how data may be stored within a block structure of the blockchain. For example, a data block may include information about the reliability of an external data source which may be stored within a data segment of the data block. By storing reliability information of an external data source within data blocks of a blockchain, the reliability as well as any changes in reliability may be appended to an immutable ledger through a hash-linked chain of blocks. Thus, a chain of reliability may be recorded within the immutable ledger and accessed by nodes of the blockchain.

FIG. 1 illustrates a blockchain network 100 implementing a reliability database within a distributed ledger, according to example embodiments. Referring to FIG. 1, the blockchain network 100 includes a plurality of peer nodes 120-123 and an ordering node 130 which communicate via a network 140 such as the Internet, a private network, and/or the like. Here, the peer nodes 120-123 may correspond to different untrusting entities, but embodiments are not limited thereto. Each peer node 120-123 may be capable of acting as a submitting node (client node) for submitting transactions for storage on a blockchain. The blockchain may be stored within a distributed ledger which is replicated among all of the peer nodes 120-123. Each of the peer nodes 120-123 may also be capable of acting as an endorsing node.

In the example of FIG. 1, a client 110 submits a transaction request to peer node 122 for execution and storage within the blockchain managed by the blockchain network 100. The transaction may be forwarded to endorsing peer nodes which may be predefined by one or more endorsement policies. In some cases, prior to submitting the transaction request to peer node 122, the client 110 may want information on an external data source that is to provide data that will be used for the transaction. Each of the peer nodes 120-123 may store a respective reliability database 120A-123A within a distributed ledger that is replicated and shared among the peer node 120-123. The reliability database 120A-123A may store reliability information of an external data source and/or the external data by category type from among a plurality of category types of data. The reliability information may be provided from a trusted service that is chosen by the peer nodes 120-123 in advance. In some embodiments, the reliability database 120A-123A may be implemented within a state database of the distributed ledger or some other key value store (KVS) which records attributes of reliability of an external data source which may include one or more of an organization ID of the external data source, a category type of the external data, a timestamp of the reliability determination, and a reliability value.

In response to receiving a reliability request from the client 110, the peer node 122 may access the reliability database 122A to retrieve reliability information of an external data source and/or its data to be provided to the transaction. In some embodiments, the external data may be further managed based on categories. In other words, the reliability may be further refined into specific categories of data types. For example, an external data source may have a different reliability value for stocks versus medical data, etc. The reliability information retrieved from the reliability database 122A may be transmitted from the peer node 122 to the client 110. In response, the client 110 may determine whether or not to conduct the blockchain transaction.

Figure 2A:
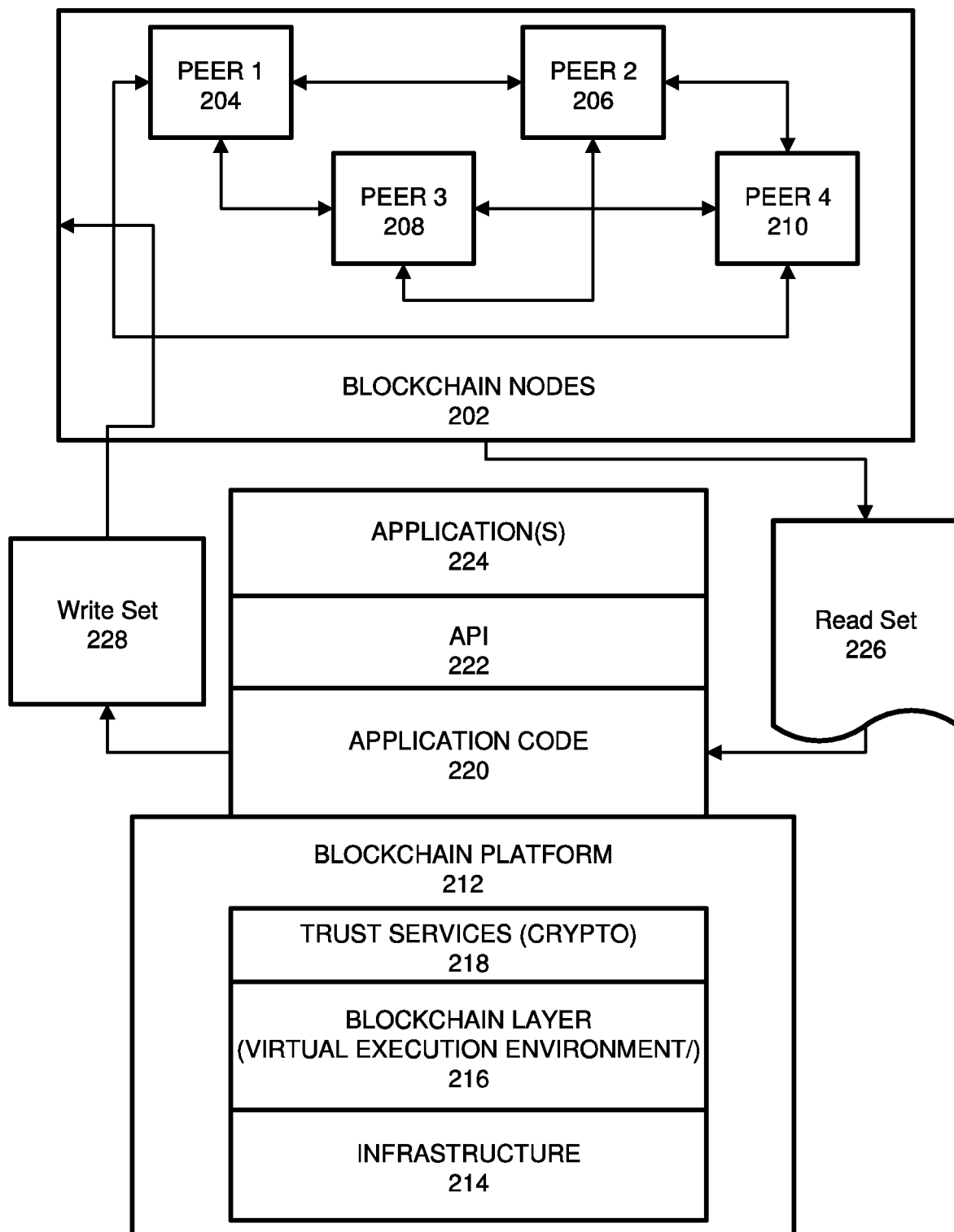
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. Also, the smart contracts can be used to store and update reliability data of external data sources within a reliability database on the distributed ledger. For example, the read set 226 may be processed by one or more processing entities (e.g., virtual machines) included in the blockchain layer 216. The write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
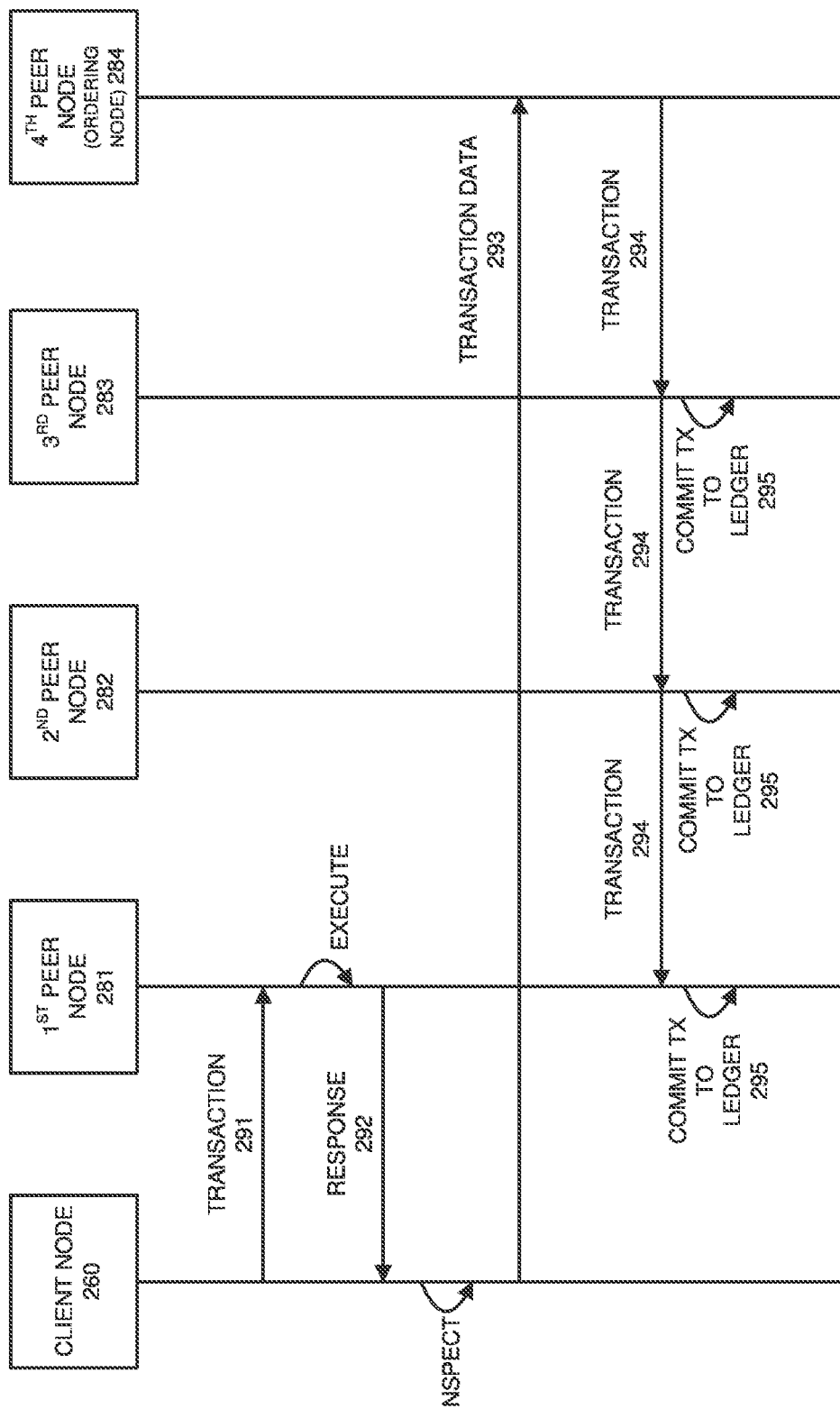
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. There may be more than one endorser, but one is shown here for convenience. The client 260 may include an application that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and reliability information described herein. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
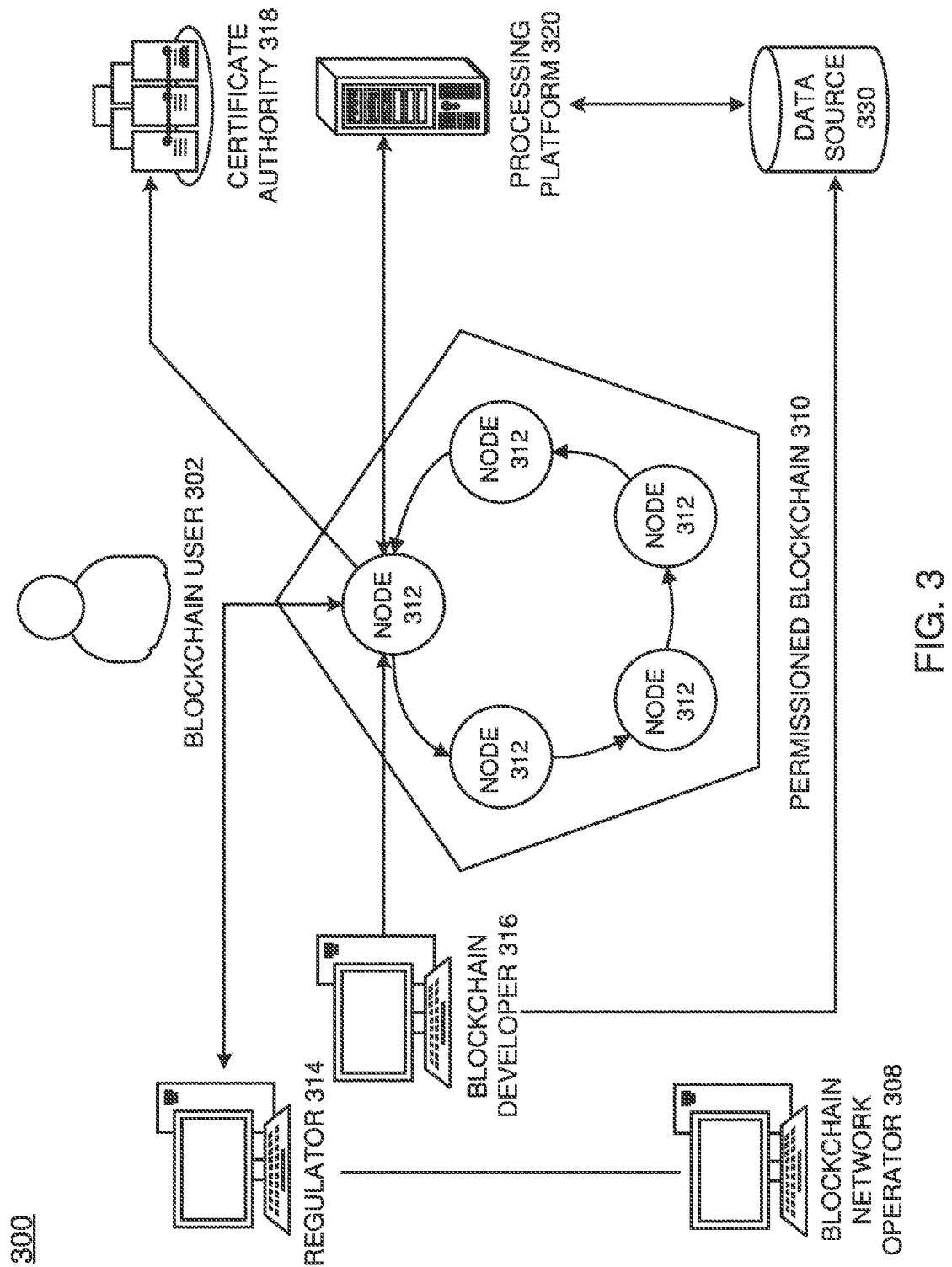
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
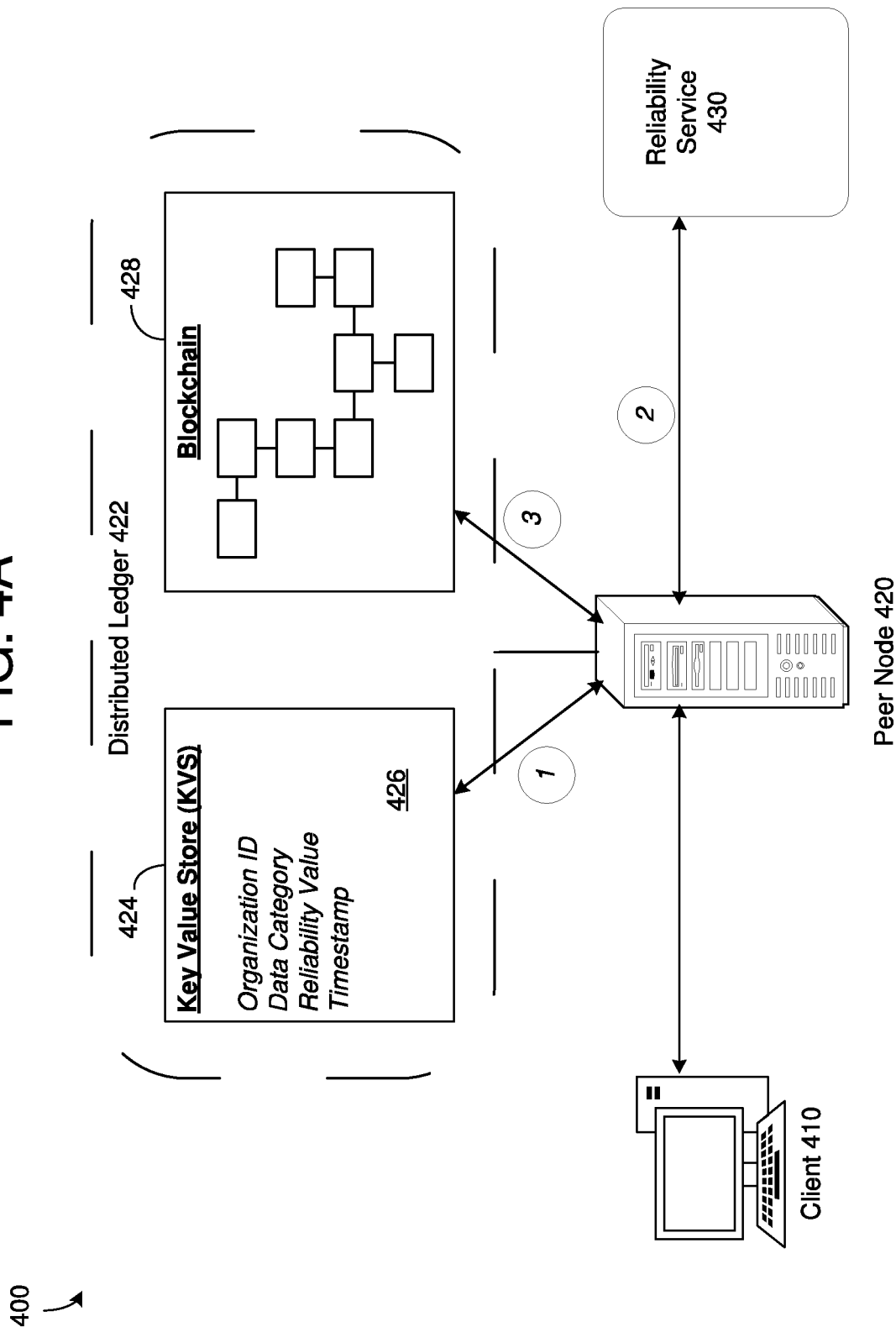
FIG. 4A is a diagram illustrating a process of a blockchain peer node retrieving reliability data, according to example embodiments.

FIG. 4A illustrates a process 400 of a blockchain peer node 420 retrieving reliability data, according to example embodiments. For example, the process 400 may be implemented by chaincode executing on the blockchain peer node 420. In this example, the peer node 420 may perform various steps. In a first step, the peer node 420 may receive a request from a client 410 for reliability information of an external data source. In response, the peer node 420 may attempt to retrieve the reliability data from a key value store 424 that is implemented within a distributed ledger 422. Here, the peer node 420 may be a member of a blockchain network that includes a plurality of peer nodes, and each peer node may store a replica of the key value store 424 which may be used as a reliability database.

The peer node 420 may maintain one or more attributes 426 for each external data source in the reliability database (KVS 424, in this example). Examples of the attributes 426 include an ID of the external data source such as an organization ID, an enterprise ID, an individual ID, a group ID, and the like. Other attributes 426 may include a data category type of the external data source/reliability, a reliability value, and a timestamp at which the reliability value was added to the KVS 424. In some embodiments, an external data source may have multiple reliability values for multiple data categories. Therefore, the request from the client 410 may include an identification of the category of data from among a plurality of possible categories. The KVS 424 may store the most current state of the reliability information for an external data source. In some embodiments, the KVS 424 may be implemented within a world state database of the distributed ledger 422, but embodiments are not limited thereto.

When a peer node 420 is able to find a reliability value for the external data source within the KVS 424, the peer node 420 may provide the reliability value to other peer nodes (or an ordering node) for consensus. In addition, the other peer nodes may retrieve their reliability values for the external data source, come to an agreement on the reliability value, and provide the agreed reliability value to the client. Here, the agreed upon reliability value may be reached based on a combination of the reliability values retrieved from the reliability databases of each of the peer nodes. These values may be different. Therefore, the agreed upon reliability value may be a combination or an average of these values from all peer nodes or at least those nodes that have a reliability value stored therein.

Figure 4B:
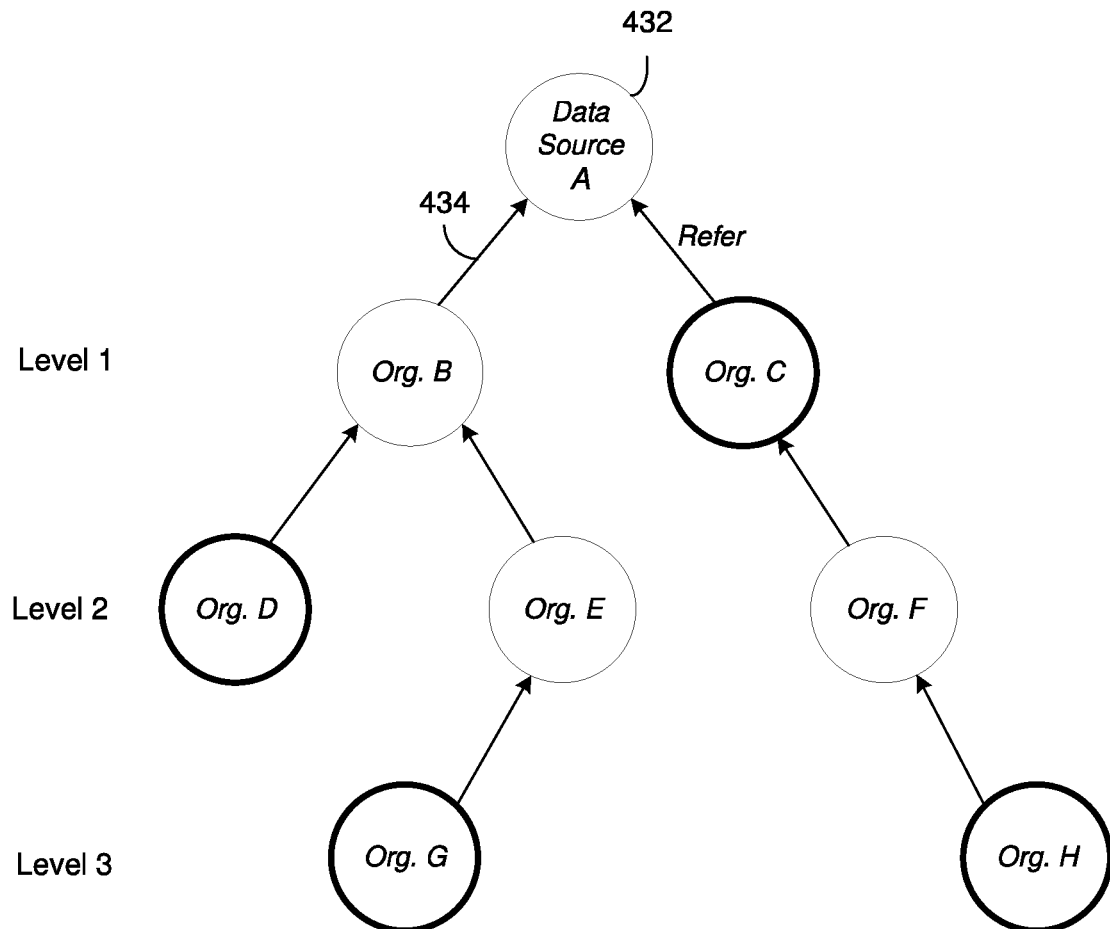
FIG. 4B is a diagram illustrating a recursive data structure storing reliability data, according to example embodiments.

If the peer node 420 is unable to find a reliability value for the requested external data source within the KVS 424, the peer node 420 may retrieve a reliability value for the external data source from a reliability service 430. The reliability service 430 may be agreed upon by peer nodes among the blockchain network at a time of setting up the blockchain or subsequently. The reliability service 430 may store trust information, reliability scores, and the like, of organizations that are involved with the blockchain network. For example, the reliability service 430 may store trust information within a recursive tree structure 431 such as shown in FIG. 4B. In this example, reliability data of an external data source 432 may be stored as a parent node.

However, if no express reliability value is currently stored for the data source 432, the reliability service 430 may determine a reliability value from other organizations that refer or that evaluate the reliability of the external data source 432. These other organizations may be other organizations that are identified from the KVS 424 as having a reference to the external data source or otherwise deal with the external data source 432 in the past. As another example, these organizations may have other relationships with the external data source such as intermediate business dealings, expert opinions, and the like, which are not identified from the KVS 424. Accordingly, the reliability service 430 can attempt to find reliability information from a first level of the recursive tree structure 431 based on pointers 434 indicating which organizations refer to the reliability of the external data source 432.

In some embodiments, the reliability service 430 may recursively move from level to level within the tree structure to identify a chain of reliability data based on levels of referral. For example, the second level of organizations in the recursive data structure 431 may not evaluate the trust of the external data source 432, but instead may evaluate the reliability of the organizations that directly evaluate the reliability of the external data source 432. This recursive process can continue to the third level, a fourth level (not shown), and so on until a predetermined limit of recursive levels has been reached. Accordingly, a chain of reliability can be retrieved based on intermediate relationships with the external data source. To generate the final reliability value, the reliability service 430 may use a combination of the recursively retrieved reliability information (e.g., scores, ratings, etc.). For example, an average value, a median value, a maximum value, a minimum value, and the like, may be used to determine the final reliability value. As another example, a weighted combination of values may be used where the reliability data gathered higher in the recursive tree structure 431 is given greater weight that the reliability data gathered lower in the recursive tree structure 431. Trust information from the other organizations may be recursively gathered by the service 430 from various sources such as social networks, evaluation of experts, actual value of sales and/or its increase/decrease, management state, and so on. These are just examples and the example embodiments are not limited thereto.

Referring again to FIG. 4A, the reliability service 430 can provide the requested reliability value to the peer node 420. As another example, the reliability service 430 may periodically send updates (or proactively receive requests for updates) of reliability values to the peer node 420. In this way, the peer node 420 may proactively update the reliability values stored therein on a continuous basis and without a request from the client 410. Based on a reliability value received from the reliability service 430, the peer node 420 may provide the reliability value to the client 410. For example, when the peer node 420 determines that a consensus on the reliability value retrieved from the reliability service 430 has been agreed upon by the peer nodes of the blockchain network, the peer node 420 may provide the reliability value to the client 410. Here, the consensus may be determined when an endorsement policy has been satisfied for changes to the reliability value to be stored in the KVS 424. In other words, before a reliability value can be stored or modified within the KVS 424, a consensus of peer nodes may be required to endorse the change. The endorsement may be performed by the peer nodes signing the modification. Furthermore, the recursive tree structure 431 allows the service 430 to look for other companies (parties) that evaluate the external data source. If the "other companies" do not exist in the reliability database, the service may further look for other companies that evaluate the other companies. This process may be performed recursively.

In response to a change in the reliability database (KVS 424) such as the storage of a reliability value of an external data source for the first time, or an update to a previously stored reliability value of the external data source, a transaction may be stored in blockchain 428 that is also on the distributed ledger 422. The transaction may identify the external data source, the modification to the reliability (e.g., new, modified, deleted, etc.) and a timestamp at which the change occurred. In some embodiments, the peer node 420 may capture a snapshot of the reliability database (e.g., the KVS 424) including the current values of reliability for one or more external data sources, and store the snapshot within the blockchain 428. The snapshot may comprise a key, a reliability value identified by the key, and a timestamp, for each external data source and category combination. If the reliability value is a general reliability for the external data source without restriction on category, the category information may be null. In some embodiments, the modification of the reliability such as the snapshot or the like, may be hashed prior to storing the data within the blockchain 428.

By updating the blockchain 428 to include all changes to a reliability value for an external data source, a trail of changes to the reliability value may be stored immutably on the blockchain 428 and accessed by auditors and other interested parties.

As will be appreciated, each peer in a blockchain may store a reliability database regarding the reliability of an external data source, as (source, category) pair, which is initialized at the blockchain peer with the support of a trustable research company or the like and is agreed by the peers. When a request for reliability data of the external data source is received from a client, the peer nodes may retrieve their reliability values for the external data source, come to an agreement on the reliability value, and provide the agreed reliability value to the client.

Furthermore, the reliability database may be updated (i.e. added with updated timestamp and reliability values) after agreement when some reliability values are updated at external parties and/or through the transaction, and all the peers are synchronized on the data in the reliability database. When there is a request for reliability evaluation of the external data source (for a specific category) from a client or other third party, if the reliability data of the external data source is in the reliability database, the blockchain peer node may use it.

However, if reliability is not within the reliability database, the peer node may request the trusted reliability service to recursively identify a reliability of the external data source based on organizations or groups that evaluate the external data source, recursively, until such groups(s) that evaluates the external data source is found. Furthermore, a new reliability value may be provided from the service and added or otherwise recorded in reliability database. In some embodiments, the peer node may go to the trusted reliability service to get the new reliability data proactively without request from a client. This may be done periodically, randomly, or the like.

According to various embodiments, a client can get the reliability value of the data or data source that they want to evaluate, even if it's not in the reliability DB. Here, a peer node may recursively determine the reliability value based on external sources (e.g., organizations) that have some sort of relationship with the data source. The reliability data within the reliability DB may include the reliability value with (source, data category, tirestamp, reliability value, etc.) format, where source may be a name of a company or a group. When the category type is found with its source, the reliability data for that (source, category) pair n the DB is returned to the client. However, data category is not mandatory, since some data may just have its source but not category, like (organization name, null, 2018-9-11, 0.5). In this case, for the request from the client, if just the source is found (category is not found) in the reliability DB, the node may return the reliability data of the source.

Also, for storing reliability of data, data category is not mandatory. For example, the received data source may just include the company name without category type. In this case, data category cannot be identified. If the reliability data is updated and the reliability value is transmitted to some clients before, the system may inform the updated reliability value to the past clients. When the reliability value is not in the DB, the system may determine the reliability value of an external data source from recursively retrieved reliability data. In this step, one of the reliability calculation methods is to put weights on the data based on the depth of the recursion and the reliability of the organization who provides the reliability data.

Figure 5A:
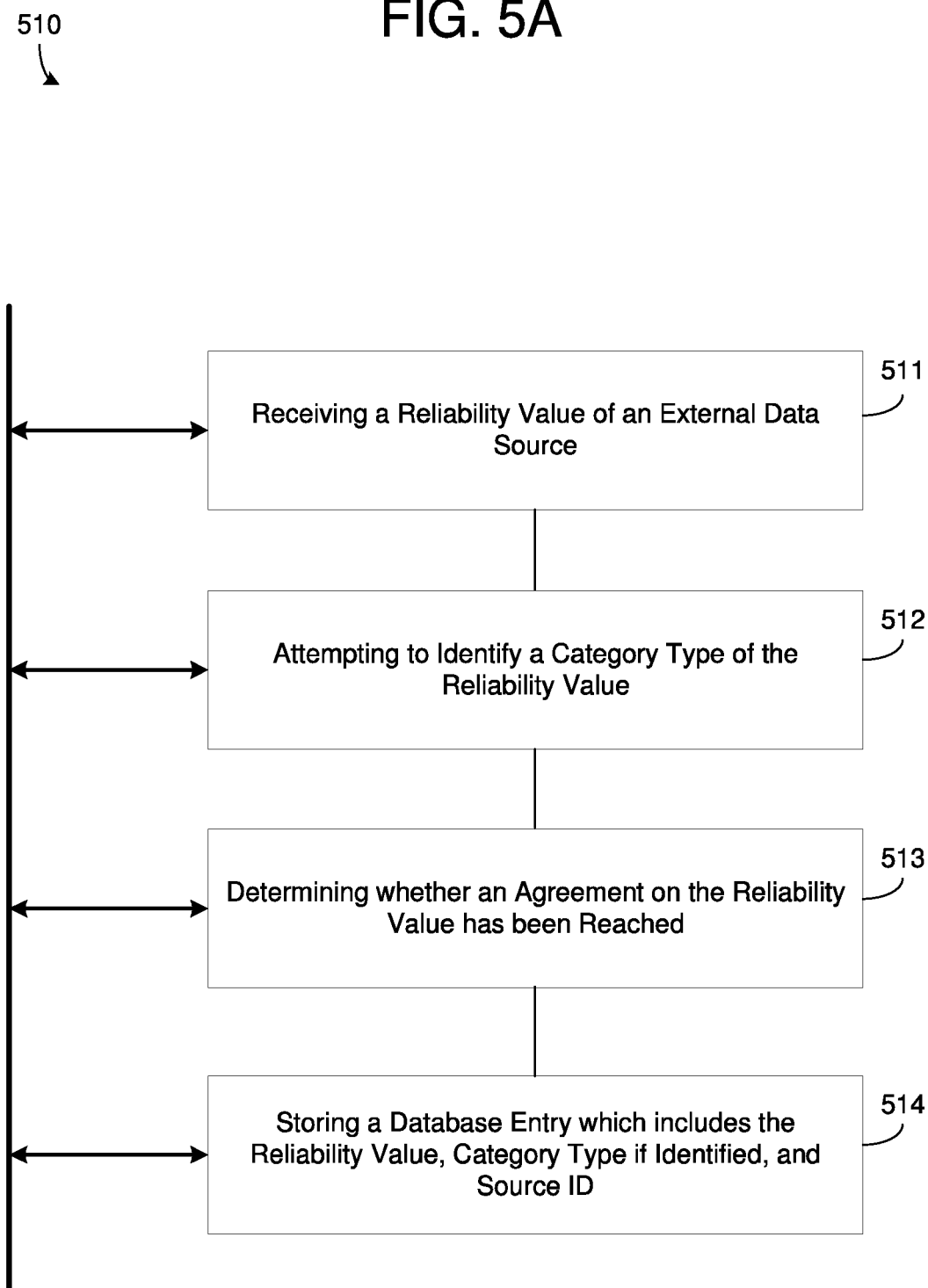
FIG. 5A is a diagram illustrating a method of storing reliability data of an external data source on a distributed ledger, according to example embodiments.

FIG. 5A illustrates a method 510 of storing reliability data of an external data source on a distributed ledger, according to example embodiments. Any of the methods described herein including the method of FIG. 5A may be performed by a computing system such as the computing system 800 shown in FIG. 8, or the like. For example, the computing system may be a blockchain peer node, a server, a cloud platform, a database, a user device, a combination of devices, and the like. Referring to FIG. 5A, in 511, the method may include receiving a reliability value of an off-chain data source. For example, the reliability value may represent a level of trust associated with one or more of the off-chain data source and a data element provided from the off-chain data source. The value may simply state "TRUST" or "DO NOT TRUST." As another example, the reliability value may be a rating that is somewhere in between a range of values (e.g., between 0 to 1.0, −1.0 to 1.0, 0 to 100, etc.) In some embodiments, the reliability value may be received from a trusted service that is agreed upon by the blockchain nodes in advance. The off-chain data source may be an external system (e.g., hardware, software, etc.) that is not allowed access to the distributed ledger.

In 512, the method may include attempting to identify a category type of the reliability value of the off-chain data source from among a plurality of category types. Category types may include categories of data such as financial, medical, insurance, legal, and the like. There are many different categories of data, and the embodiments should not be construed as limited to any particular category of data. In some embodiments, an external data source may be assigned different reliability values for different categories of data. In some embodiments, the category type may be null. In other words, there may be no category type for the data. Rather, the reliability may be for all categories, the external data source in general, and the like.

In 513, the method may include determining whether an agreement on the received reliability value has been reached among a plurality of peer nodes. For example, the agreement may be a consensus among multiple peer nodes of a final reliability value for the external data source. The final reliability value may be based on a combination of reliability values stored by the peer nodes such as an average, a median, a maximum, a minimum, or the like. In some embodiments, the final reliability value that is identified from the determining may be a different reliability value than the received reliability value.

Furthermore, in response to a determination that the agreement has been reached, in 514 the method may include storing a database entry which includes an identity of the off-chain data source, the category type if identified, and the agreed upon reliability value within a reliability database on a distributed ledger of the plurality of peer nodes. For example, the reliability database may be implemented within a key value store on the distributed ledger. In some embodiments, the database entry may further include a timestamp at which the database entry is added to the reliability database. In some embodiments, the distributed ledger which implements the reliability database may further include a blockchain shared among the plurality of nodes. In some embodiments, if the retrieved reliability value includes an updated reliability value, the method may include transmitting the updated reliability value to one or more clients to inform them of the updated reliability value.

Figure 5B:
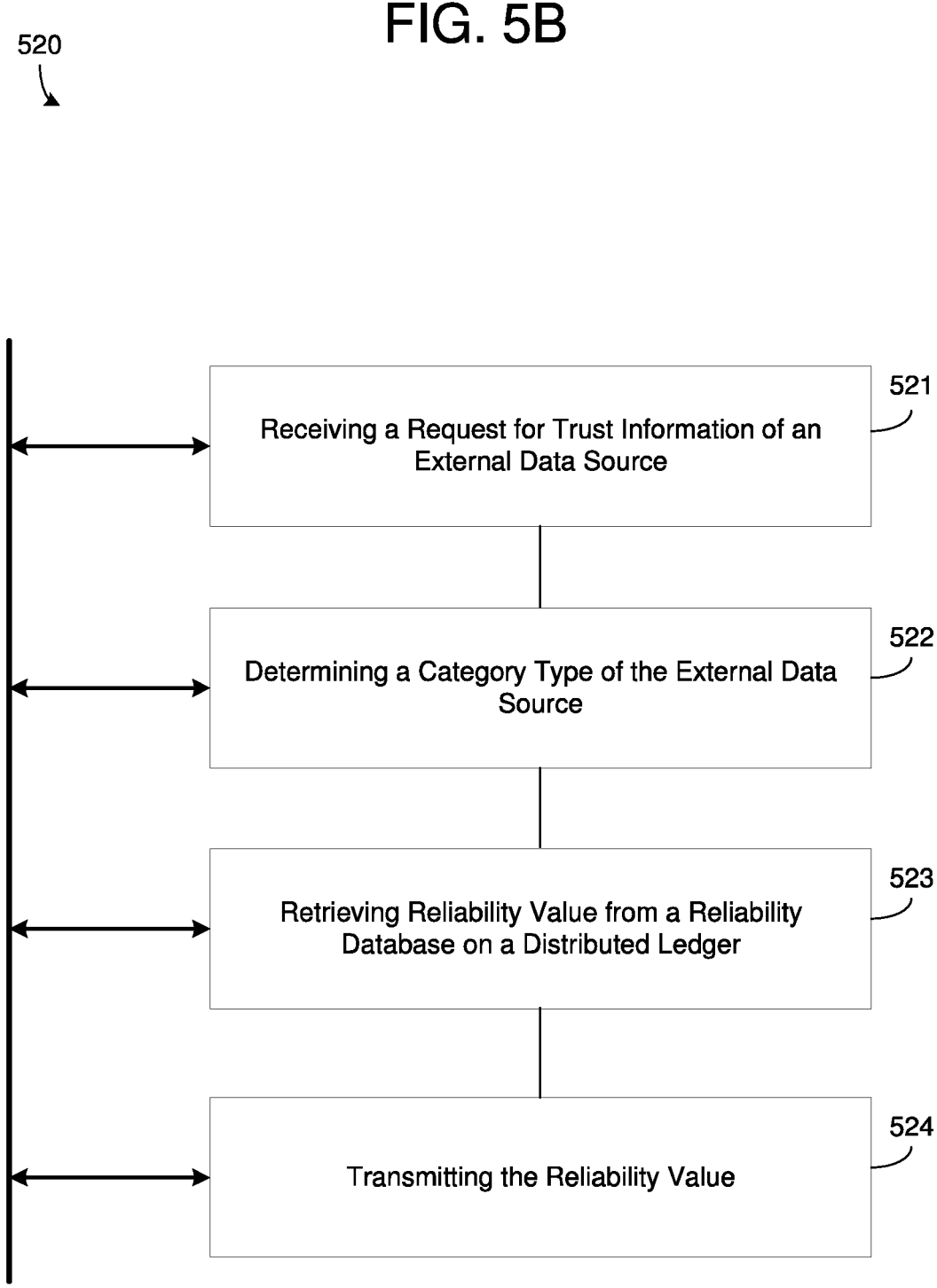
FIG. 5B is a diagram illustrating a method of retrieving reliability data of an external data source from a distributed ledger, according to example embodiments.

FIG. 5B illustrates a method 520 of retrieving reliability data of an external data source from a distributed ledger, according to example embodiments. Referring to FIG. 5B, in 521 the method may include receiving a request for trust information of an off-chain data source from a client. For example, the request may be sent to a blockchain peer node prior to a transaction being entered into by the client. In 522, the method may include determining a category type of the off-chain data source from among a plurality of category types based on the request.

Based on an identification of the off-chain data source and/or the category type, in 523 the method may further include retrieving a reliability value of the off-chain data source linked to one or more of an identity of the off-chain data source and the determined category type from a reliability database implemented via a distributed ledger shared among a plurality of peer nodes. In some embodiments, the reliability value may be retrieved with only the data source ID (off-chain organization ID, etc.). As another example, when the off-chain data source has multiple categories of data and multiple reliability values corresponding thereto, the category type may also be used to retrieve the data from the reliability database implemented via the distributed ledger. As another example, when the determined category type is not found but the identity of the data source is found in the reliability database, the method may retrieve the reliability value of the off-chain data source linked to the identity of the data source from the reliability database. In 524, the method may include transmitting the retrieved reliability value linked to the category type to the client.

In some embodiments, the retrieving may include retrieving the reliability value of the off-chain data source from a key value store on the distributed ledger. In some embodiments, the retrieving may include identifying a database entry associated with the off-chain data source from among a plurality of database entries associated with the off-chain data source corresponding to a plurality of category types. In some embodiments, the retrieved reliability value indicates a level of trust associated with one or more of the off-chain data source and a data element provided from the off-chain data source. In some embodiments, the distributed ledger which implements the reliability database may further include a blockchain shared among the plurality of nodes.

Figure 5C:
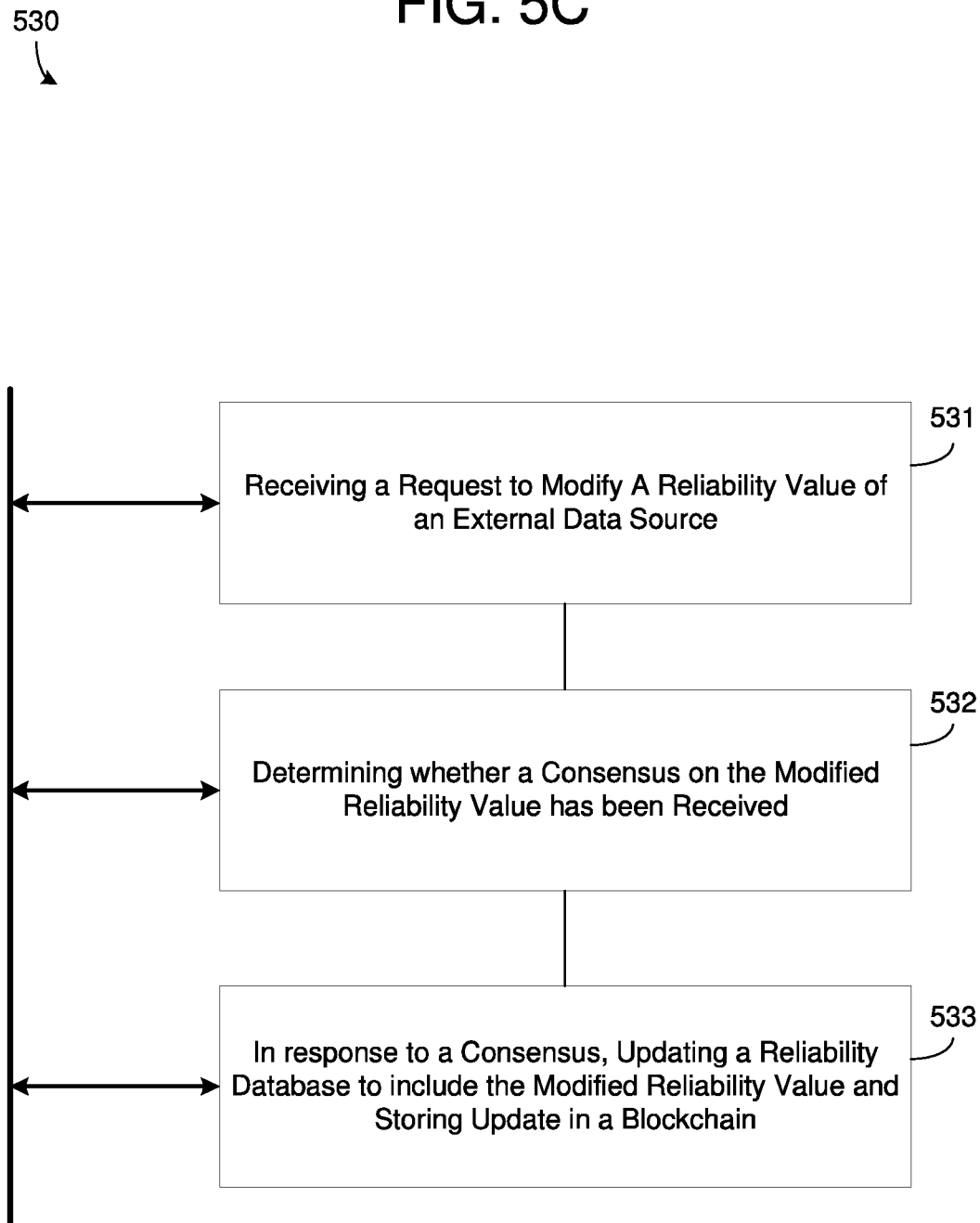
FIG. 5C is a diagram illustrating a method of storing modifications in reliability of an external data source via a blockchain, according to example embodiments.

FIG. 5C illustrates a method 530 of storing modifications in reliability of an external data source via a blockchain, according to example embodiments. Referring to FIG. 5C, in 531, the method may include receiving a request to modify a reliability value of an off-chain data source to generate a modified reliability value. For example, the request may be received from another peer node, a trusted service, and the like. The modified reliability value may include storing a reliability value of an external data source for a first time. As another example, the modified reliability value may include an updated to a previously stored reliability value associated with the external data source. The reliability value may be associated with a category type of data from among a plurality of categories.

In 532, the method may include determining whether a consensus on the modified reliability value has been received among a plurality of peer nodes. For example, the consensus may occur when enough peer nodes have endorsed the modification to the reliability value. Here, the endorsement policy may be based on any desired policy that is agreed upon by the peer nodes of the blockchain in advance. In response to a determination that the consensus has been received, in 533 the method may include updating a storage to reflect the modified reliability value associated with the off-chain data source, and storing an identification of the modified reliability value within a block among a hash-linked chain of blocks on a distributed ledger shared among the plurality of peer nodes. In some embodiments, a timestamp may also be stored with the modification in the blockchain to identify a point in time at which the modification occurred.

In some embodiments, the storage may be a reliability database implemented on a state database of the distributed ledger and the hash-linked chain of blocks may be a blockchain stored on the distributed ledger. In some embodiments, the modified reliability value may include a change in trust associated with the off-chain data source. In some embodiments, the identification of the modified reliability value stored in the block among the hash-linked chain of blocks may include an identification of a difference between the modified reliability value of the off-chain data source with respect to a previously stored reliability value of the off-chain data source. In some embodiments, the off-chain data source may include a computing system that does not have access to the distributed ledger. In some embodiments, the determining whether the consensus has been reached may include determining whether a predetermined amount of the plurality of peer nodes have endorsed the modified reliability value. In some embodiments, the method may further include transmitting the modified reliability value to one or more clients (nodes, applications, etc.) to inform them of the modified reliability value.

FIG. 5D illustrates a method 540 of storing a snapshot of a database via a blockchain, according to example embodiments. Referring to FIG. 5D, in 541 the method may include storing data of one or more off-chain data sources within a database. For example, the database may be a reliability database which is implemented on a distributed ledger. In 542, the method may include receiving a notification of a change to the data of the one or more off-chain data sources stored in the database. The notification may include an indication that a consensus has been reached with respect to a change in the database. As another example, the notification may be triggered by a request, or the like.

In 543, the method may include capturing a snapshot of the data within the database based on the notification, where the snapshot identifies a historical state of the data within the database, and in 544, the method may include storing the captured snapshot of the data in a block from among a hash-linked chain of blocks on a distributed ledger. The snapshot may include an image, a file, or the like, which captures a list of current database values within the database. The snapshot may be specific to a particular type of data, a particular organization, a particular time period, or the like, although embodiments are not limited thereto.

In some embodiments, the snapshot captures current key values for reliability of a plurality of off-chain data sources. In some embodiments, the snapshot captures current key values for each of a plurality of category types of data for an off-chain data source. In some embodiments, the snapshot captures current key values within a key value store stored on the distributed ledger. In some embodiments, the method may further include hashing the captured snapshot prior to storing the captured snapshot in the block from among the hash-linked chain of blocks to protect the snapshot from unauthorized access.

Figure 5E:
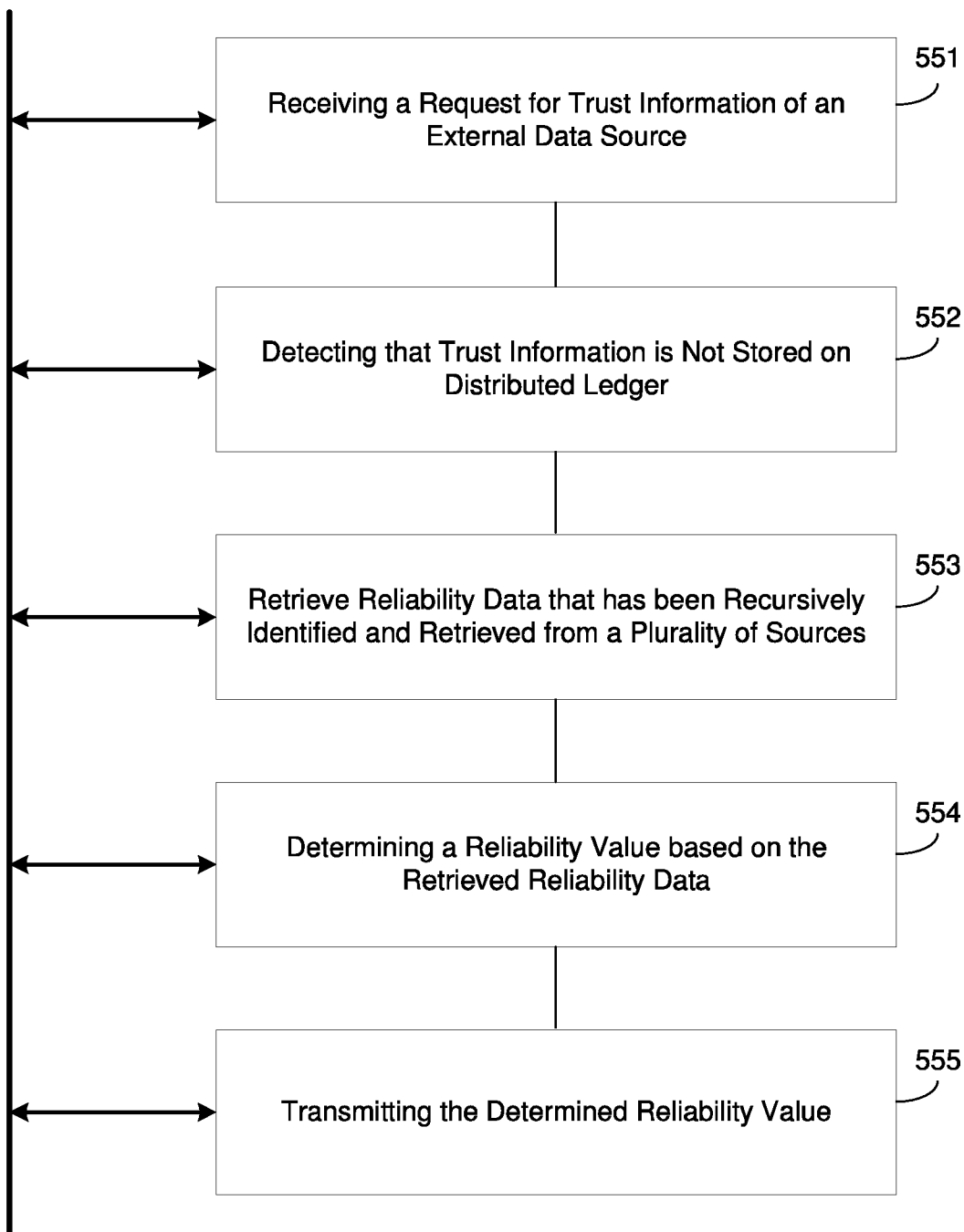
FIG. 5E is a diagram illustrating a method of determining reliability of an external data source based on recursively retrieved data, according to example embodiments.

FIG. 5E illustrates a method 550 of determining reliability of an external data source based on recursively retrieved data, according to example embodiments. Referring to FIG. 5E, in 551, the method may include receiving a request for trust information of an off-chain data source from a client. The request may include a request from a client that is about to conduct a transaction on a blockchain based on data from the off-chain data source. In 552, the method may include detecting that the trust information of the off-chain data source is not stored in a distributed ledger shared among a plurality of peer nodes. For example, the peer node may determine whether a reliability value of the off-chain data source is stored within a reliability database stored on the distributed ledger.

In 553, the method may include retrieving reliability data recursively identified and retrieved from a plurality of external sources having different reliability information of the off-chain data source. In some embodiments, the reliability data may be recursively identified from among the plurality of external sources until a threshold number of external sources has been reached. In 554, the method may include determining a reliability value based on a combination of the recursively retrieved reliability data from the plurality of external sources, and in 555, transmitting the determined reliability value to the client.

Figure 5F:
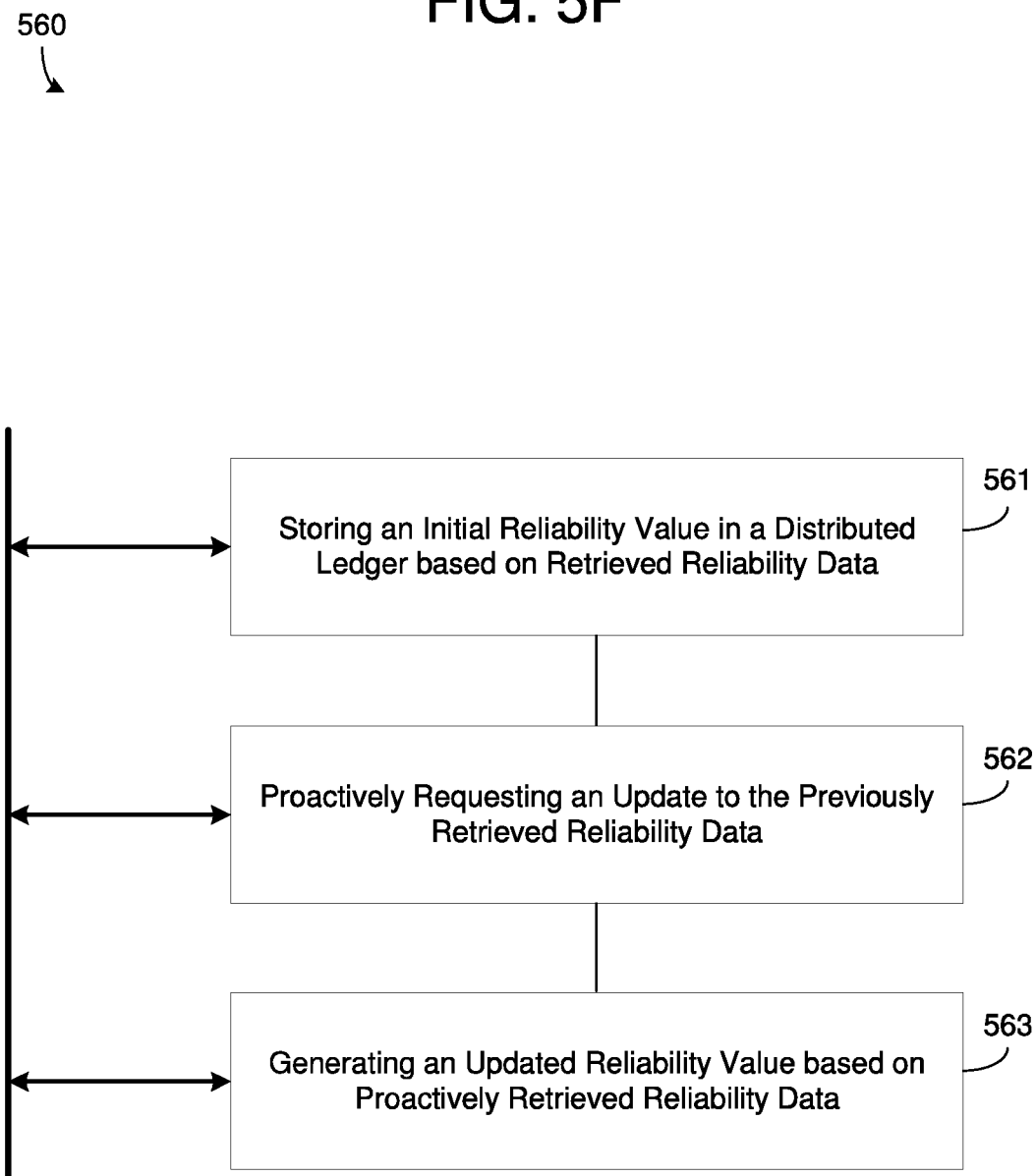
FIG. 5F is a diagram illustrating a method of proactively updating reliability data of an external data source, according to example embodiments.

In some embodiments, the method may further include updating a reliability database of the distributed ledger to include the determined reliability value. In some embodiments, the method may further include storing an identification of the determined reliability value and a timestamp within a data block among a hash-linked chain of data blocks on the distributed ledger. In some embodiments, the determined reliability value may indicate a level of trust associated with one or more of the off-chain data source and a data element provided from the off-chain data source. In some embodiments, the determining may include determining the final value as an average value of the recursively retrieved reliability data from the plurality of external sources. In some embodiments, the determining may include determining the reliability value after weighting based on a depth of the recursion and a reliability of the external data sources that provided the reliability data FIG. 5F illustrates a method 560 of proactively updating reliability data of an external data source, according to example embodiments. Referring to FIG. 5F, in 561, the method may include storing an initial reliability value in a distributed ledger based on a combination of the recursively retrieved reliability data from a plurality of sources. For example, the recursively retrieved reliability data may be retrieved by a trusted service that identifies relationships of entities to an external data source and identifies trust/reliability information in a recursive fashion. For example, if an organization does not have a direct reliability rating for an external data source, the service may identify a trust/reliability information of an organization that has dealings with the external data source or that otherwise evaluates the external data source. In this way, trust/reliability information of the external data source may be obtained indirectly by retrieving a trust/reliability data of an intermediate organization that in some way is connected to the external data source such as through previous dealings on the blockchain, a relationship, a referral of some kind, and the like.

In 562, the method may include proactively requesting updates to the previously retrieved reliability data from the plurality of sources. For example, the proactively requesting may include transmitting a request to each of the plurality of sources at predetermined intervals. For example, the proactively requesting may include transmitting a request to each of the plurality of sources randomly. In response to receiving an updated reliability data from one or more sources, in 563 the method may include generating an updated reliability value based on the updated reliability data, and modifying the initial reliability value stored on the distributed ledger based on the updated reliability value. In some embodiments, the updated reliability value may indicate an updated level of trust associated with one or more of the off-chain data source and a data element provided from the off-chain data source. In some embodiments, the method further include storing an identification of the updated reliability value and a timestamp of the update within a data block among a hash-linked chain of data blocks on the distributed ledger.

Figure 6A:
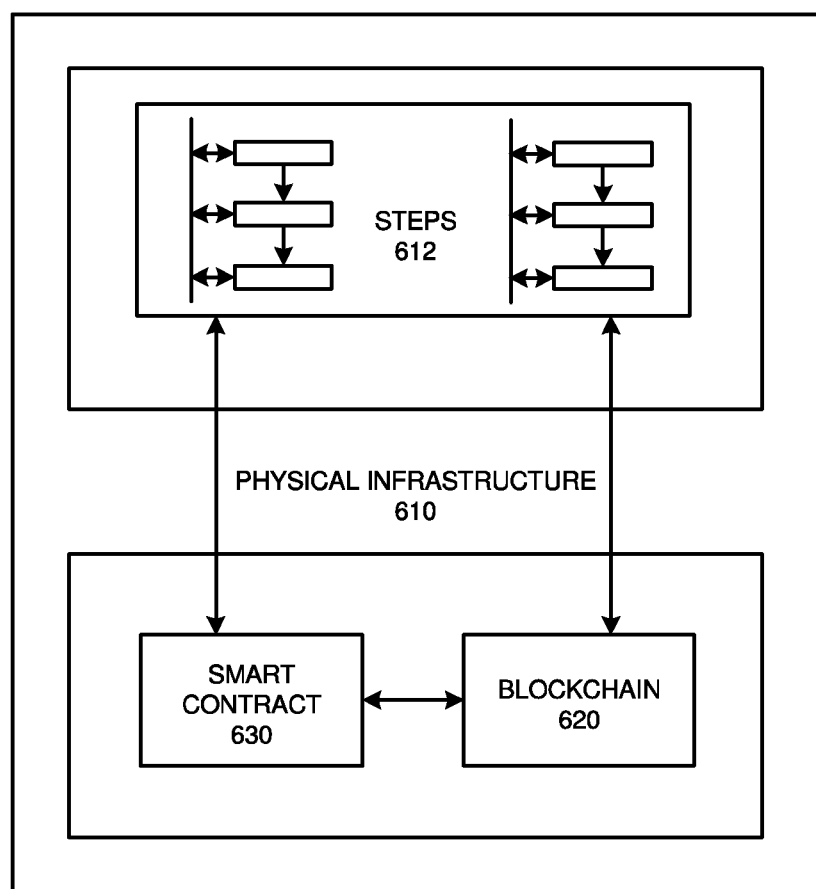
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices. In some embodiments, the smart contract 630 also referred to as chaincode may be executed to retrieve blockchain resource information from a blockchain notification board.

Figure 6B:
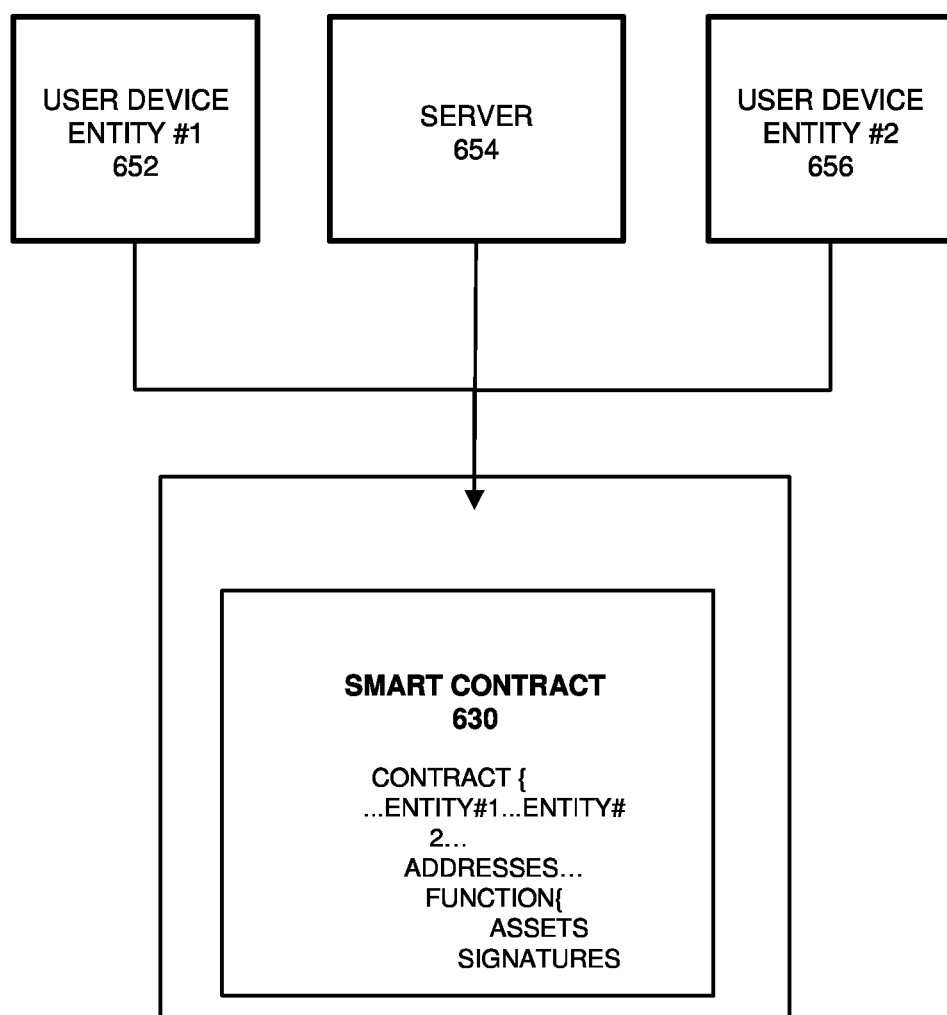
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
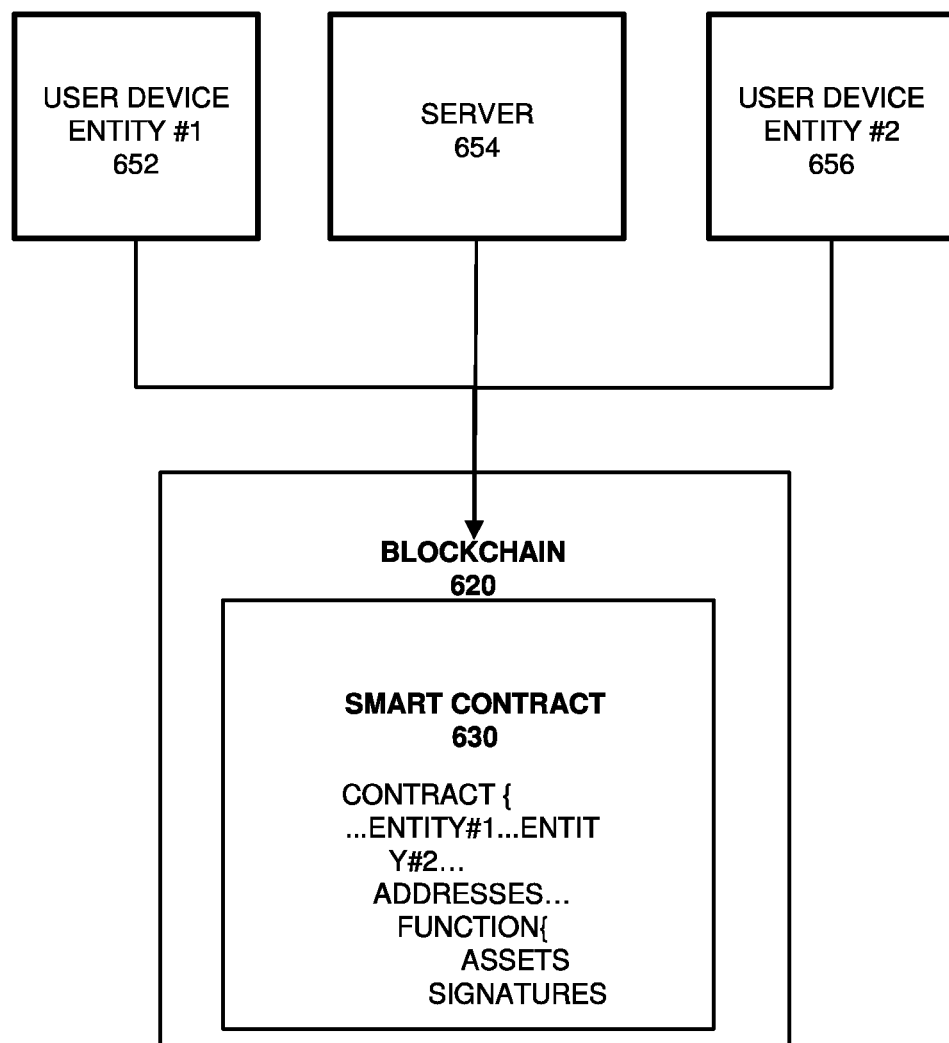
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
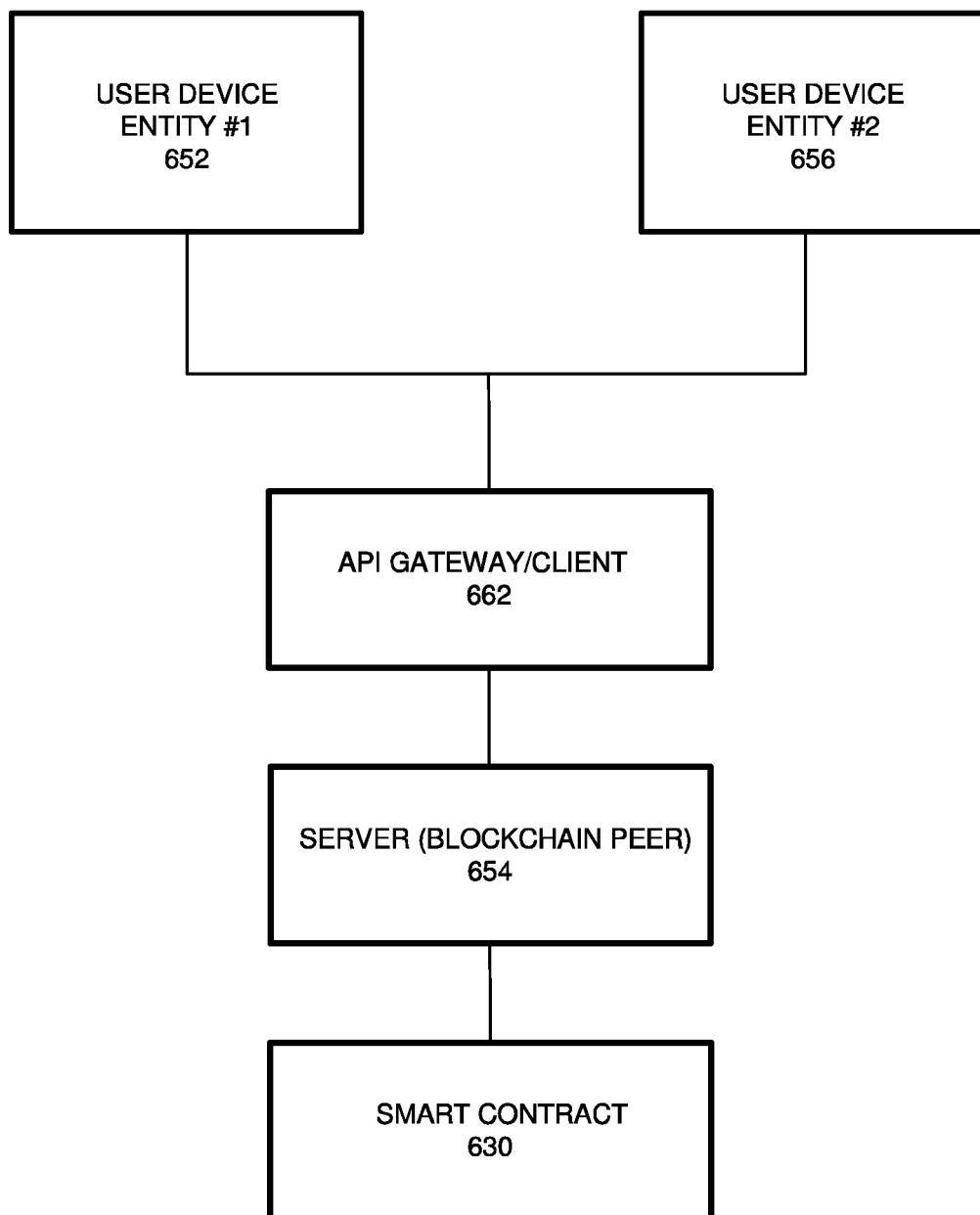
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a KVS) within a distributed ledger allowing clients 652 and 656 to query data on the world state as well as submit transactions into the blockchain network where, depending on the smart contract 630 and endorsement policy, endorsing peers will run the smart contracts 630.

According to various embodiments, the smart contract 630 of the present application may have different APIs 662 that perform different programs for storing and retrieving reliability data from a reliability database and/or a trusted service. For example, the smart contract 630 may include an API that can receive a request from a client for reliability of an external data source, retrieve a reliability value of the external data source for a particular category, and output the reliability. As another example, the smart contract 630 may include an API that can request a reliability value from a trusted service when it determines that a reliability value for the external data source is not stored in the reliability database. As another example, the smart contract 630 may include an API that agrees on a consensus of newly coming trusted data of the external data source prior to storing the trusted data in the reliability database.

Figure 7A:
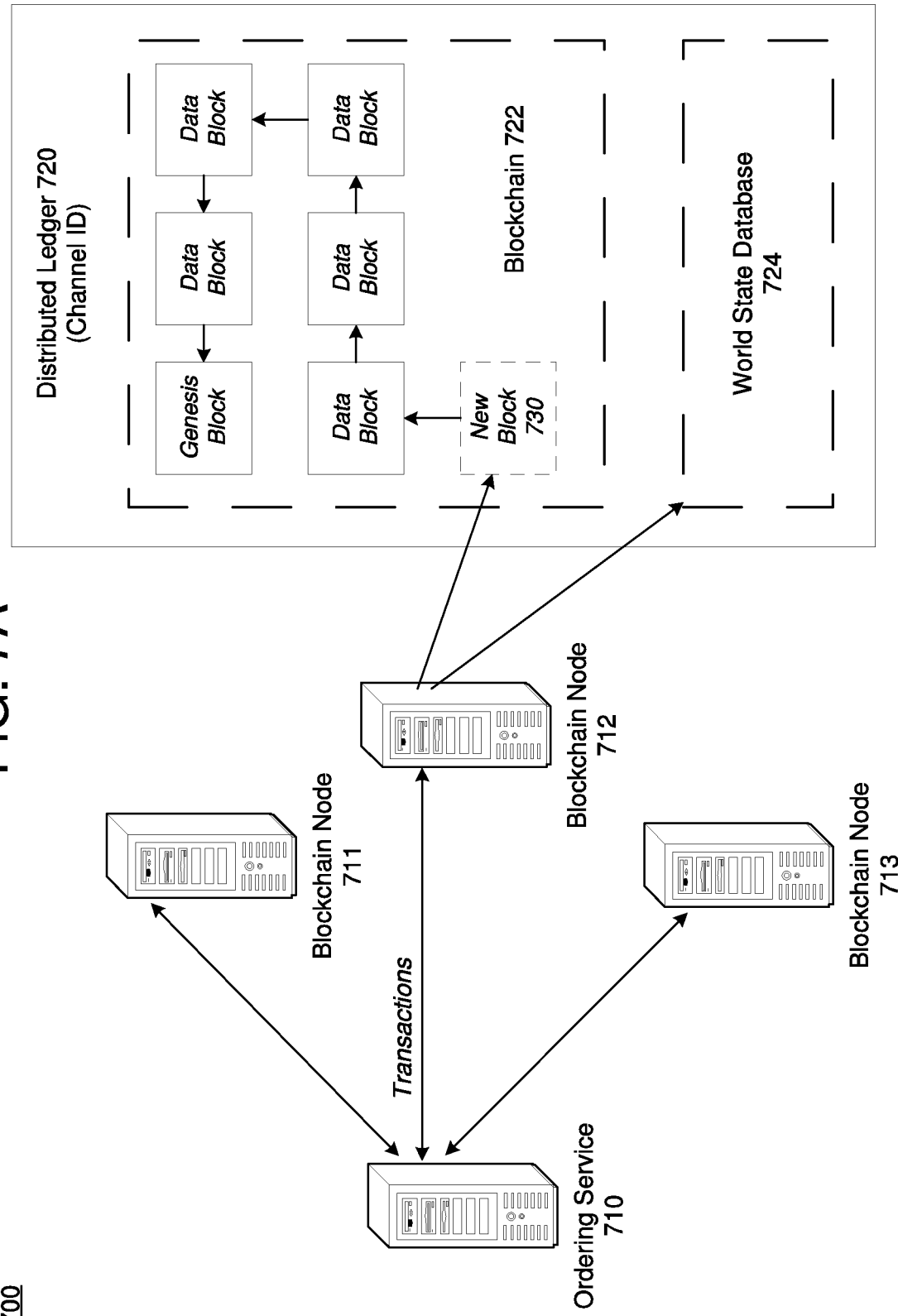
FIG. 7A is a diagram illustrating a process of a new block being added to a blockchain ledger, according to example embodiments.
Figure 7B:
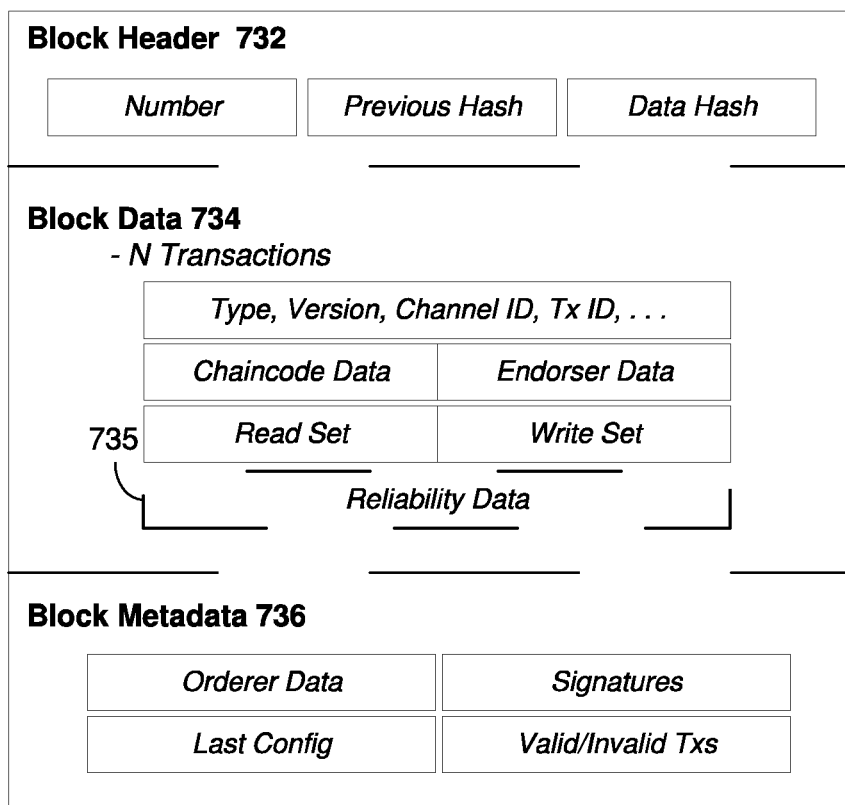
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734. According to various embodiments, each transaction may include reliability information 735 within the block data 734 that is added by the ordering node 710. The reliability information 735 may be different (or a modification of) previously stored reliability information that is provided by the submitting node.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 734 section of block 730 may store information about modifications, updates, deletes, additions, or other changes to a reliability value of an external data source within reliability information 735. The reliability information 735 may include a category type of the external data, a reliability value (e.g., −1.0 to 1.0, etc.), a timestamp, an identity of the external data source, an identification of the change in the reliability value, and the like.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
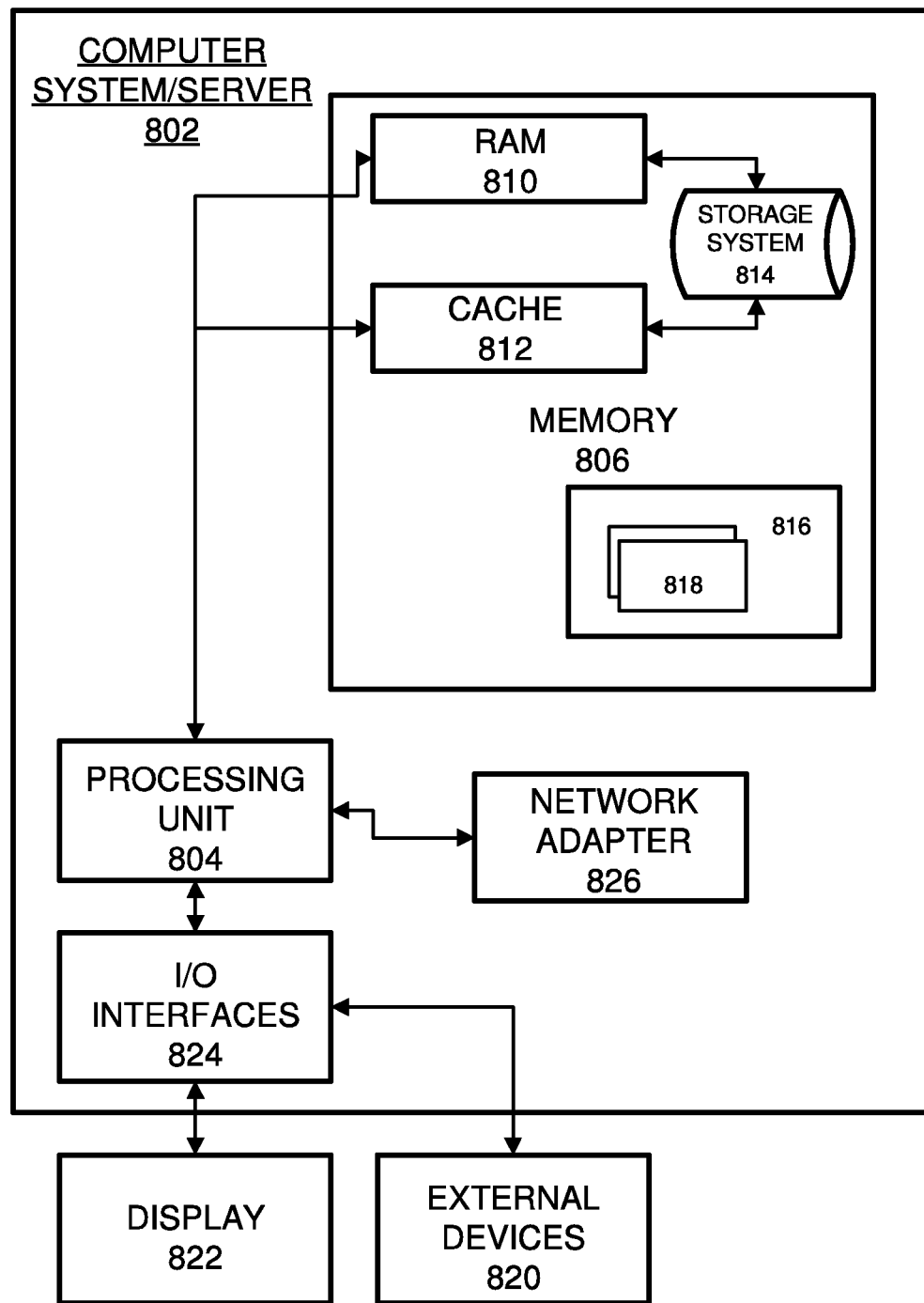
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform any of the methods 510-560 shown and described with respect to FIGS. 5A-5F.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802;

and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a network interface configured to receive a request to modify a reliability value of an off-chain data source to generate a modified reliability value, wherein the request identifies a category of data of the off-chain data source that is used as an input for a blockchain transaction, and the reliability value represents a reliability of the off-chain data source with respect to the category of data; and
   a processor configured to determine whether a consensus on the modified reliability value has been received among a plurality of peer nodes, and, in response to a determination that the consensus has been received, update a storage to reflect the modified reliability value associated with the off-chain data source for that category of data, and store an identification of the modified reliability value within a block among a hash-linked chain of blocks on a distributed ledger shared among the plurality of peer nodes.

2. The computing system of claim 1, wherein the storage and the hash-linked chain of blocks are stored on the distributed ledger.

3. The computing system of claim 1, wherein the modified reliability value comprises a change in trust associated with the off-chain data source.

4. The computing system of claim 1, wherein the identification of the modified reliability value stored in the block among the hash-linked chain of blocks comprises an identification of a difference between the modified reliability value of the off-chain data source with respect to a previously stored reliability value of the off-chain data source.

5. The computing system of claim 1, wherein the off-chain data source comprises a system that does not have access to the distributed ledger.

6. The computing system of claim 1, wherein the processor is configured to determine whether a predetermined amount of the plurality of peer nodes have endorsed the modified reliability value.

7. The computing system of claim 1, wherein the processor is further configured to transmit the modified reliability value to one or more clients to inform them of the modified reliability value.

8. A method comprising:
receiving a request to modify a reliability value of an off-chain data source to generate a modified reliability value, wherein the request identifies a category of data of the off-chain data source that is used as an input for a blockchain transaction, and the reliability value represents a reliability of the off-chain data source with respect to the category of data;
determining whether a consensus on the modified reliability value has been received among a plurality of peer nodes; and
in response to a determination that the consensus has been received, updating a storage to reflect the modified reliability value associated with the off-chain data source for that category of data, and storing an identification of the modified reliability value within a block among a hash-linked chain of blocks on a distributed ledger shared among the plurality of peer nodes.

9. The method of claim 8, wherein the storage and the hash-linked chain of blocks are stored on the distributed ledger.

10. The method of claim 8, wherein the modified reliability value comprises a change in trust associated with the off-chain data source.

11. The method of claim 8, wherein the identification of the modified reliability value stored in the block among the hash-linked chain of blocks comprises an identification of a difference between the modified reliability value of the off-chain data source with respect to a previously stored reliability value of the off-chain data source.

12. The method of claim 8, wherein the off-chain data source comprises a computing system that does not have access to the distributed ledger.

13. The method of claim 8, wherein the determining whether the consensus has been reached comprises determining whether a predetermined amount of the plurality of peer nodes have endorsed the modified reliability value.

14. The method of claim 8, wherein the method further comprises transmitting the modified reliability value to one or more clients to inform them of the modified reliability value.

15. A non-transitory computer readable medium comprising instructions, that when read by a processor, cause the processor to perform a method comprising:
receiving a request to modify a reliability value of an off-chain data source to generate a modified reliability value, wherein the request identifies a category of data of the off-chain data source that is used as an input for a blockchain transaction, and the reliability value represents a reliability of the off-chain data source with respect to the category of data;
determining whether a consensus on the modified reliability value has been received among a plurality of peer nodes; and
in response to a determination that the consensus has been received, updating a storage to reflect the modified reliability value associated with the off-chain data source for that category of data, and storing an identification of the modified reliability value within a block among a hash-linked chain of blocks on a distributed ledger shared among the plurality of peer nodes.

* * * * *